United States Patent
Dziech et al.

(10) Patent No.: US 6,283,712 B1
(45) Date of Patent: Sep. 4, 2001

(54) COOLING AIR SUPPLY THROUGH BOLTED FLANGE ASSEMBLY

(75) Inventors: Aaron M. Dziech, Cincinnati; Daniel E. Reisenauer, West Chester; William Z. Bolt; Richard W. Albrecht, Jr., both of Fairfield; Steven D. Ward, Cincinnati, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/391,305

(22) Filed: Sep. 7, 1999

(51) Int. Cl.$^7$ ................................. B63H 1/16; F01D 5/14
(52) U.S. Cl. ........................................... 416/179; 415/115
(58) Field of Search ........................................ 415/115, 116; 416/96 R, 97 R, 244 R, 244 A, 179, 190, 193 R

(56) References Cited

U.S. PATENT DOCUMENTS

| | | | |
|---|---|---|---|
| 3,647,313 | * 3/1972 | Koff | 415/115 |
| 4,309,145 | 1/1982 | Viola . | |
| 4,309,147 | * 1/1982 | Koster et al. | 415/116 |
| 4,526,508 | 7/1985 | Antonellis et al. . | |
| 4,582,467 | 4/1986 | Kisling . | |
| 4,844,694 | * 7/1989 | Naudet | 416/198 A |
| 5,232,339 | * 8/1993 | Plemmons et al. | 415/115 |
| 5,236,302 | 8/1993 | Weisgerber et al. . | |
| 5,338,154 | 8/1994 | Meade et al. . | |
| 5,350,278 | * 9/1994 | Burge | 416/198 A |
| 5,472,313 | 12/1995 | Quinones et al. . | |
| 5,630,703 | 5/1997 | Hendley et al. . | |

* cited by examiner

Primary Examiner—John E. Ryznic
(74) Attorney, Agent, or Firm—Andrew C. Hess; Nathan D. Herkamp

(57) ABSTRACT

A preferred embodiment of the present invention is a gas turbine engine rotor assembly having axially spaced apart forward and aft disks circumferentially disposed about an axis. The forward disk has an aftwardly extending annular forward arm and the aft disk has a forwardly extending annular aft arm. Forward and aft flanges are located at forward and aft ends of the forward and aft arms respectively. Forward and aft pluralities of aligned forward and aft bolt holes extending axially through the forward and aft flanges respectively. A scalloped annular ring having a plurality of circumferentially spaced apart tabs with spaces therebetween is disposed between the flanges. A plurality of ring bolt holes extend axially through the plurality of circumferentially spaced apart tabs such that corresponding ones of the ring, forward, and aft bolt holes are axially aligned. Forward and aft pluralities of apertures extend axially through the forward and aft flanges and the spaces are in fluid flow communication with corresponding forward and aft ones of the apertures. A plurality of bolts are preferably used to attach the forward and aft flanges together and each of the bolts is disposed through corresponding ones of the ring, forward and aft bolt holes.

19 Claims, 4 Drawing Sheets

COOLING AIR SUPPLY THROUGH BOLTED FLANGE ASSEMBLY

BACKGROUND OF THE INVENTION

1. Field of the Invention

This invention relates to aircraft gas turbine engine turbine rotors and disks and, more particularly, to bolted flanges of adjacent turbine rotor disks.

2. Discussion of the Background Art

Gas turbine engines frequently multi-stage turbine rotors having adjacent turbine disks bolted together to form the turbine rotor. In the high pressure turbine rotors cooling air must be supplied to the roots of turbine blades through rims of the turbine disks. The adjacent disks have conical arms with flanges as their ends and the flanges are typically bolted together forming a conical wall assembly across which cooling air must be flowed to reach the rims and turbine blade roots.

Typically, holes have been placed in the arms of disks to allow cooling air to flow across the arms. It is desirable to avoid putting these holes through an arm of a disk, since these holes weaken the disk and limit its life.

SUMMARY OF THE INVENTION

A preferred embodiment of the present invention is a gas turbine engine rotor assembly having axially spaced apart forward and aft disks circumferentiaily disposed about an axis. The forward disk has an aftwardly extending annular forward arm and the aft disk has a forwardly extending annular aft arm. Forward and aft flanges are located at forward and aft ends of the forward and aft arms respectively. Forward and aft pluralities of aligned forward and aft bolt holes extending axially through the forward and aft flanges respectively. A scalloped annular ring having a plurality of circumferentially spaced apart tabs with spaces therebetween is disposed between the flanges. A plurality of ring bolt holes extend axially through the plurality of circumferentially spaced apart tabs such that corresponding ones of the ring, forward, and aft bolt holes are axially aligned. Forward and aft pluralities of apertures extend axially through the forward and aft flanges and the spaces are in fluid flow communication with corresponding forward and aft ones of the apertures. Preferably, each aperture of the pluralities of apertures is circumferentially located between each two of the forward and aft bolt holes. A plurality of bolts are preferably used to attach the forward and aft flanges together and each of the bolts is disposed through corresponding ones of the ring, forward, and aft bolt holes. At least one of the forward and aft bolt holes are different from the apertures such that the bolts cannot be disposed through the apertures.

A more specific embodiment of the gas turbine engine turbine rotor assembly further includes an annular interstage seal extending between the forward and aft disks. The forward and aft disks include annular outer forward and aft disk rims attached by annular forward and aft disk webs to annular forward and aft disk bores, respectively. The annular forward arm extends aftwardly from the forward web and an annular aft arm extends forwardly from the aft web. The forward and aft flanges are removably attached to each other at forward and aft ends of the forward and aft arms respectively forming a radially outer annular interstage volume extending radially between the forward and aft flanges and the interstage seal and a radially inner annular interstage volume extending radially inwardly of the forward and aft flanges. The invention provides apparatus for passing cooling air between the forward and aft flanges from the inner annular interstage volume to the outer annular interstage volume. A plurality of coolable turbine blades are mounted around a periphery of the aft rim. Each blade has a root mounted in the aft rim and a coolable airfoil extending radially outwardly from a platform attached to the root. Cooling passages are used for flowing cooling air from the outer annular interstage volume to the coolable airfoils. The cooling passages include cooling air passageways are formed in the aft rim leading from the outer annular interstage volume to the roots of the coolable blades and the airfoils.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
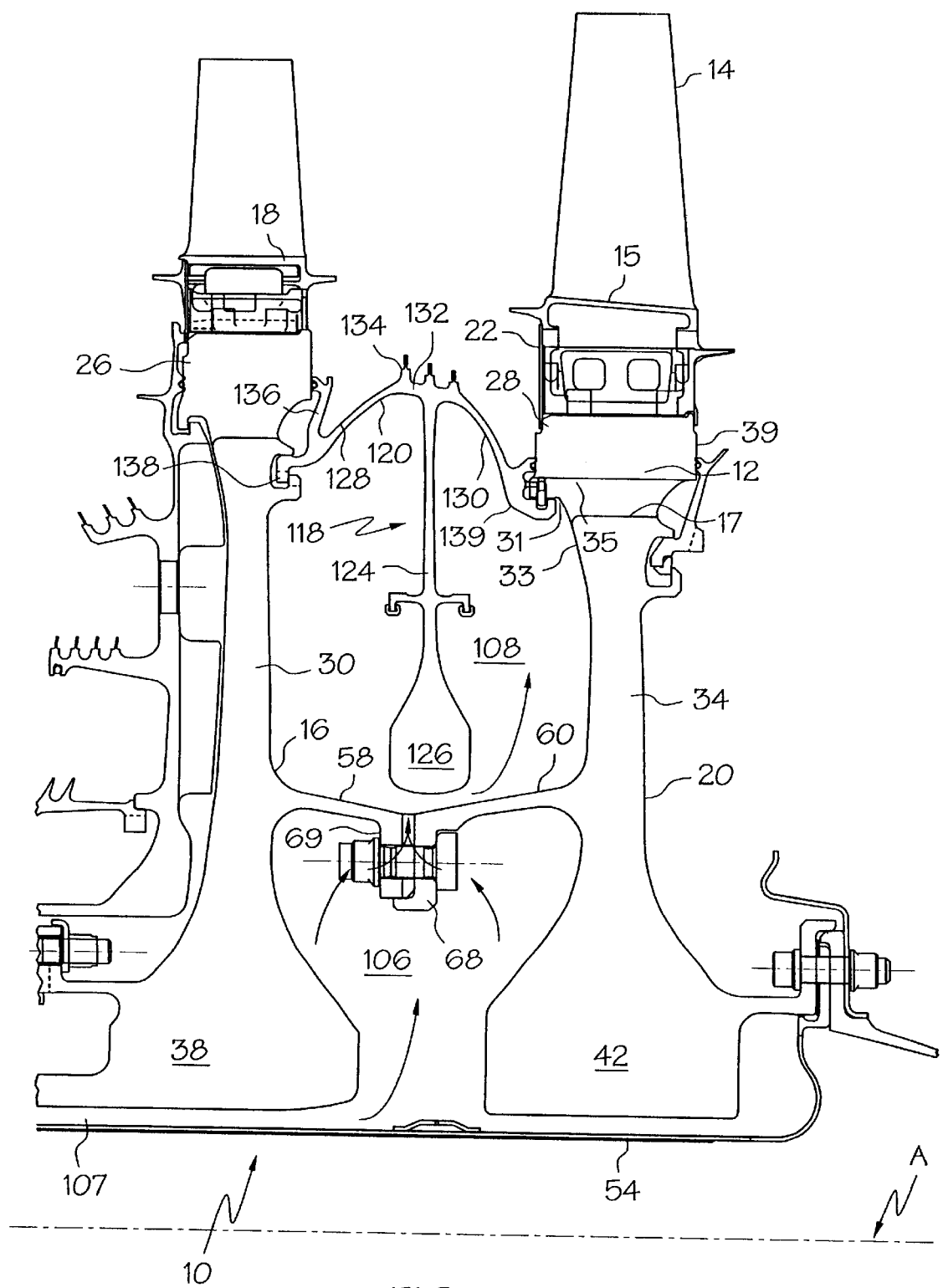
FIG. 1 is a schematic cross-sectional view illustration of a gas turbine engine two stage high pressure turbine rotor section and bolted assembly with cooling passages of the present invention.

Illustrated in FIG. 1 is an exemplary embodiment of the present invention in a high pressure turbine rotor assembly 10 circumferentially disposed about an axis A of a gas turbine engine. A first stage or forward disk 16 has a plurality of first stage blades 18 circumferentially spaced about a periphery thereof and a second stage or aft disk 20 has a plurality of second stage blades 22 circumferentially spaced about the periphery thereof. The forward and aft disks 16 and 20, respectively, include annular outer forward and aft disk rims 26 and 28 attached by annular forward and aft disk webs 30 and 34 to annular forward and aft disk bores 38 and 42, respectively.

Each of first stage blades 18 second stage blades 22 comprises a root 12 and an airfoil 14 with a platform 15 therebetween and integral therewith. The root 12 is disposed in a similarly shaped slot 17 in the aft disk rim 28 and the slot extends axially through the aft rim from a disk front face 33 to a disk rear face 39 of the aft disk 20. The slot 17 is open to a front annular space 31 on the disk front face 33. Cooling air is supplied from the front annular space through the slot and then fed into cooling circuits within the airfoils 14 through cooling passageways in the root 12 and used to cool the airfoil.

Figure 2:
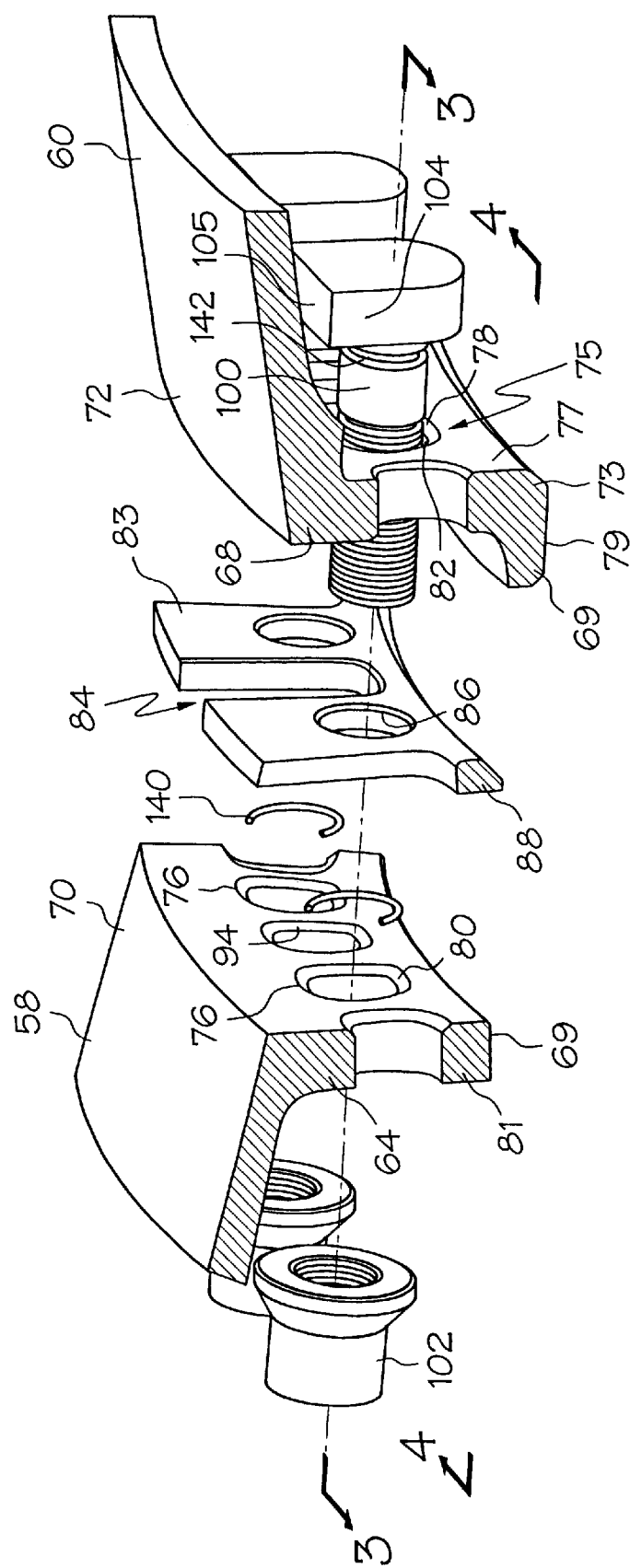
FIG. 2 is exploded perspective view illustration of the bolted assembly in FIG. 1.
Figure 3:
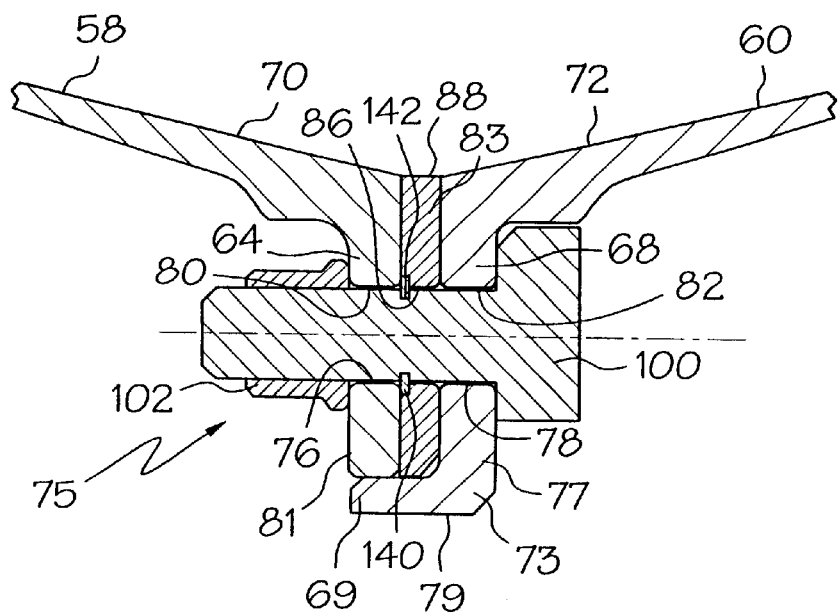
FIG. 3 is a schematic cross-sectional view illustration of the bolted assembly taken through bolt holes and lines 3—3 of the bolted assembly in FIG. 2.
Figure 4:
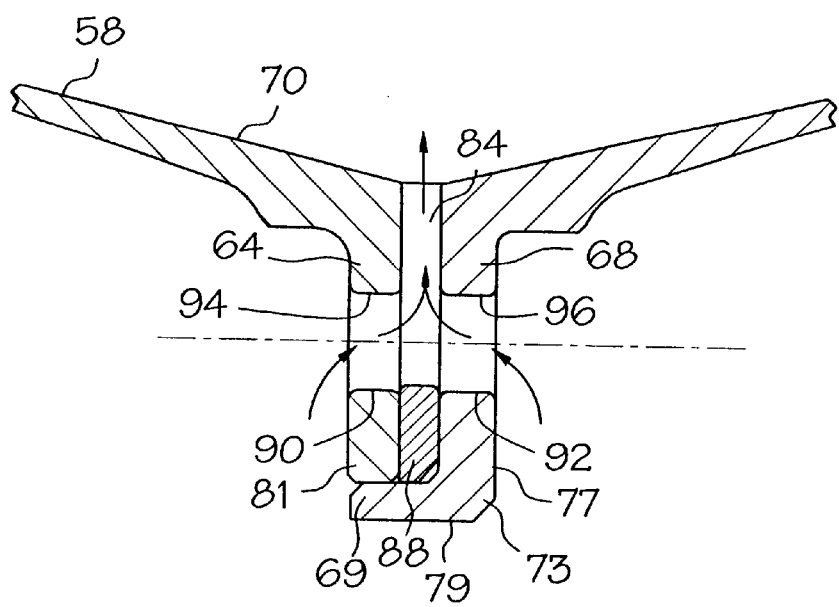
FIG. 4 is a schematic cross-sectional view illustration of the bolted assembly taken through apertures and lines 4—4 of the bolted assembly in FIG. 2.

The forward and aft disks 16 and 20 are connected to an engine shaft (not shown). This connection typically employs a spline assembly (not shown) to attach the forward and aft disks 16 and 20 to the engine shaft. The forward and aft disks 16 and 20 includes flanged annular forward and aft arms 58 and 60, respectively. Illustrated in greater detail in FIGS. 2, 3, and 4 are integrally formed forward and aft flanges 64 and 68 that are located at forward and aft ends 70 and 72 of the forward and aft arms 58 and 60, respectively. A rabbet joint 69 is employed to mate the forward and aft flanges 64 and 68. The rabbet joint 69 includes a rabbet 73 on a first radially inner end 77 of the aft flange 68 has an axially extending annular leg 79 in radial contact with a second radially inner end 81 of the forward flange 64. The forward and aft flanges 64 and 68 are bolted together or otherwise removably attached to each other preferably using a bolted assembly generally shown at 75.

The bolted assembly 75 includes respective forward and aft pluralities 76 and 78 of aligned forward and aft bolt holes 80 and 82 extending axially through the forward and aft flanges 64 and 68, respectively. Forward and aft pluralities 90 and 92 of preferably axially aligned forward and aft apertures 94 and 96 are disposed through the forward and aft flanges 64 and 68, respectively. The forward and aft apertures 94 and 96 are preferably circumferentially aligned with and evenly spaced between the forward and aft bolt holes 80 and 82, respectively. Each of the forward and aft apertures 94 and 96 are illustrated as being disposed between two of circumferentially adjacent ones of the forward and aft bolt holes 80 and 82, respectively. The forward and aft apertures 94 and 96 are used to relieve or reduce hoop stress in the forward and aft flanges 64 and 68. The forward and aft apertures 94 and 96 are also used to supply cooling air across the bolted assembly of the annular forward and aft arms 58 and 60. A scalloped annular ring 88 having a plurality of circumferentially spaced apart tabs 83 with spaces 84 therebetween is disposed between the forward and aft flanges 64 and 68. A plurality of ring bolt holes 86 extend axially through the corresponding ones of the plurality of circumferentially spaced apart tabs 83 such that corresponding ones of the ring bolt holes 86 and the forward and aft bolt holes 80 and 82, respectively, are axially aligned and the spaces 84 are in fluid flow communication with corresponding ones of the forward and aft apertures 94 and 96.

A plurality of bolts 100 are disposed through corresponding ones of the ring, forward and aft bolt holes 80 and 82, respectively, and the bolts are secured in place with nuts 102. The forward and aft bolt holes 80 and 82 are different in shape and/or size from the forward and aft apertures 94 and 96 so that the bolts 100 cannot be accidently placed in the apertures instead of the bolt holes. C shaped clips 140 snap fit into ring grooves 142 around the bolts 100 to hold the scalloped annular ring 88 in place during assembly or mating of the forward and aft disks 16 and 20 and the forward and aft flanges 64 and 68. The clips 140 are stored in annular recesses 144 in an axially facing surface of the forward flange 64 around the forward bolt holes 80 when the forward and aft the forward and aft flanges 64 and 68 are mated. The bolts 100 have D shaped heads 104 with flats 105 that engage the aft arm 60 to prevent the bolts from turning when the nuts 102 are tightened on the bolts.

The scalloped annular ring 88 provides radially oriented passageways on the ring and allows the use of smooth axially facing surfaces on the flanges. This has a positive effect on the strength of the assembly allowing the design of smaller flanges and disk arms and a lower weight engine. It improves the life of the members of the assembly by also reducing wear due to fretting that might occur if radial passages were provided in the flanges. The recesses help provide smooth axially facing surfaces of the forward flange and the scalloped annular ring 88 to mate with maximum surface contact between thus providing a strong bolted assembly.

Referring back to FIG. 1, an annular interstage seal 118 extends between the forward and aft disks 16 and 20, respectively, and includes an annular outer shell 120 from which depends radially inwardly a seal web 124 and a seal bore 126. The shell 120 includes a cylindrical mid-portion 132 which supports seal teeth 134 and forward and an aft seal arms 128 and 130 connected to the forward and aft disks 16 and 20, respectively. The shell 120 has forward and aft seal arms 128 and 130 each having radially extending blade retaining rims 136. A bayonet connection 138 connects the forward seal arm 128 with the forward and disk 16 and a ring connection 139 connects the aft seal arm 130 with the aft disk 20. The annular interstage seal 118 forms a radially outer annular interstage volume 108 extending radially between the bolted assembly of the annular forward and aft arms 58 and 60 and the interstage seal and extending axially between the forward and aft disks 16 and 20.

Cooling air is supplied from a compressor stage of gas turbine engine through an annular passage 107 between the forward disk bore 38 and an annular cooling air conduit 54 shaft to a radially inner annular interstage volume 106 extending axially between the forward and aft disks 16 and 20 and located radially inwardly of the bolted assembly of the annular forward and aft arms 58 and 60. The cooling air is then metered and passed through the bolted assembly 75, though the forward and aft apertures 94 and 96 and then through the spaces 84 to a radially outer annular interstage volume 108 between the bolted assembly of the annular forward and aft arms 58 and 60. Cooling air flows from the outer annular interstage volume 108 through the front annular space 31 on the disk front face 33 and then explained above through the slot 17 to the root 12. Air passages in the root 12 passes the cooling air into the interior of the airfoils 14. The supply of cooling air from the compressor to the turbine stages is well known in the art.

Figure 5:
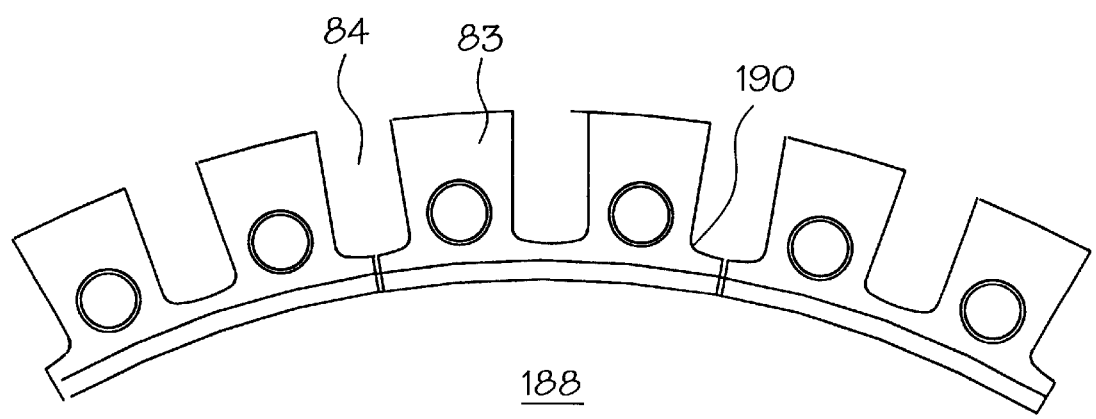
FIG. 5 is a schematic front view illustration and alternative segmented scalloped ring in the bolted assembly in FIG. 1.

Illustrated in FIG. 5 is a segmented scalloped annular ring 188 which is an alternative to the single piece scalloped annular ring 88 shown in previous FIGS. The segmented scalloped annular ring 188 is used and installed in the same basic way as the single piece scalloped annular ring 88. It may be broken into two, three, four or more segments 190 that need not each have the same number of tabs 83 and spaces 84 in each of the segments. The segmented scalloped annular ring 188 avoids hoops stresses that are capable of fracturing and failing the single piece scalloped annular ring 88.

While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine turbine rotor assembly, said assembly comprising:

axially spaced apart forward and aft disks having annular outer forward and aft rims attached by annular forward and aft webs to annular forward and aft bores and circumferentially disposed about an axis, an annular interstage seal extending between and removably connected to said forward and aft disks by connections, an annular forward arm extending aftwardly from said forward web, an annular aft arm extending forwardly from said aft web, said arms having no fluid passage therein, forward and aft flanges removably attached to each other at forward and aft ends of said forward and aft arms respectively forming a radially outer annular interstage volume extending radially between said forward and aft flanges and said interstage seal and a radially inner annular interstage volume extending radially inwardly of said forward and aft flanges, and a means for passing cooling air between said forward and aft flanges from said inner annular interstage volume to said outer annular interstage volume.

2. A gas turbine engine rotor assembly comprising:

axially spaced apart forward and aft disks circumferentially disposed about an axis, said forward disk having an aftwardly extending annular forward arm, said aft disk having a forwardly extending annular aft arm, forward and aft flanges at forward and aft ends of said forward and aft arms respectively, said forward and aft flanges having respective forward and aft pluralities of aligned forward and aft bolt holes extending axially therethrough, a scalloped annular ring having a plurality of circumferentially spaced apart tabs with spaces therebetween is disposed between said forward and aft flanges, a plurality of ring bolt holes extending axially through said plurality of circumferentially spaced apart tabs such that corresponding ones of said ring, forward, and aft bolt holes are axially aligned, at least a first one of said flanges having a first plurality of apertures extending axially therethrough, and and said spaces are in fluid flow communication with corresponding ones of said apertures.

3. An assembly as claimed in claim 1, further comprising a second plurality of apertures extending axially through a second one of said flanges and said spaces are in fluid flow communication with corresponding ones of said second apertures.

4. An assembly as claimed in claim 3 wherein said each aperture of said pluralities of apertures is circumferentially located between each two of said forward and aft bolt holes.

5. An assembly as claimed in claim 4, further comprising a plurality of bolts each of which is disposed through corresponding ones of said ring, forward, and aft bolt holes.

6. An assembly as claimed in claim 5 wherein at least one of said forward and aft bolt holes are different from said apertures such that said bolts cannot be disposed through said apertures.

7. An assembly as claimed in claim 6 further comprising a rabbet joint between said first and second ones of said flanges.

8. An assembly as claimed in claim 5 wherein said scalloped ring is a segmented scalloped annular ring having more than one circumferentially extending segment.

9. An assembly as claimed in claim 5 wherein one of said forward and aft flanges has recesses around respective ones of said forward and aft bolt holes and said bolts have grooves with C shaped clips disposed therein.

10. A gas turbine engine turbine rotor assembly, said assembly comprising:

axially spaced apart forward and aft disks having annular outer forward and aft rims attached by annular forward and aft webs to annular forward and aft bores and circumferentially disposed about an axis, an annular interstage seal extending between said forward and aft disks, an annular forward arm extending aftwardly from said forward web, an annular aft arm extending forwardly from said aft web, forward and aft flanges removably attached to each other at forward and aft ends of said forward and aft arms respectively forming a radially outer annular interstage volume extending radially between said forward and aft flanges and said interstate seal and a radially inner annular interstate volume extending radially inwardly of said forward and aft flanges, a means for passing cooling air between said forward and aft flanges from said inner annular interstage volume to said outer annular interstate volume, forward and aft pluralities of aligned forward and aft bolt holes extending axially through said forward and aft flanges respectively, and wherein said means for passing cooling air between said forward and aft flanges comprises;

a scalloped annular ring having a plurality of circumferentially spaced apart tabs with spaces therebetween is disposed between said forward and aft flanges, a plurality of ring bolt holes extending axially through said plurality of circumferentially spaced apart tabs such that corresponding ones of said ring, forward, and aft bolt holes are axially aligned, a plurality of ring bolt holes extending axially through said corresponding ones of said plurality of circumferentially spaced apart tabs such that corresponding ones of said ring, forward, and aft bolt holes are axially aligned, and and said spaces are in fluid flow communication with corresponding ones of said apertures.

11. An assembly as claimed in claim 10 wherein said each aperture of said pluralities of apertures is circumferentially located between each two of said forward and aft bolt holes.

12. An assembly as claimed in claim 11 further comprising:

a plurality of coolable turbine blades mounted around a periphery of said aft rim, each blade having a root mounted in said aft rim and a coolable airfoil extending radially outwardly from a platform attached to said root, cooling passage means for flowing cooling air from said outer annular interstage volume to said coolable airfoils.

13. An assembly as claimed in claim 12 wherein said cooling passage means includes a front annular space leading from said outer annular interstage volume to said roots disposed in slots in said aft rim.

14. An assembly as claimed in claim 13 wherein said each aperture of said pluralities of apertures is circumferentially located between each two of said forward and aft bolt holes.

15. An assembly as claimed in claim 14, further comprising a plurality of bolts each of which is disposed through corresponding ones of said ring, forward, and aft bolt holes.

16. An assembly as claimed in claim 15 wherein at least one of said forward and aft bolt holes are different from said apertures such that said bolts cannot be disposed through said apertures.

17. An assembly as claimed in claim 16 further comprising a rabbet joint between said first and second ones of said flanges.

18. An assembly as claimed in claim 15 wherein said scalloped ring is a segmented scalloped annular ring having more than one circumferentially extending segment.

19. An assembly as claimed in claim 14 wherein one of said forward and aft flanges has recesses around respective ones of said forward and aft bolt holes and said bolts have grooves with C shaped clips disposed therein.

* * * * *